United States Patent

[11] 3,542,024

[72] Inventor George K. Burke
Bethlehem, Pennsylvania
[21] Appl. No. 792,044
[22] Filed Jan. 17, 1969
[45] Patented Nov. 24, 1970.
[73] Assignee Burron Medical Products, Inc.
Bethlehem, Pennsylvania

[54] HYPODERMIC ASSEMBLY
4 Claims, 5 Drawing Figs.

[52] U.S. Cl................................................. 128/221,
285/334.4
[51] Int. Cl................................................. A61m 05/32
[50] Field of Search............................................ 128/221,
218, 218N, 218NV; 228/1; 285/334, 334.4

[56] References Cited
UNITED STATES PATENTS

| | | | |
|---|---|---|---|
| 1,668,315 | 5/1928 | Hein | 128/221 |
| 1,793,068 | 2/1931 | Dickson | 128/221 |
| 2,711,171 | 6/1955 | Dunnican | 128/218(N) |
| 3,242,029 | 3/1967 | Deans | 228/1X |
| 3,306,291 | 2/1967 | Burke | 128/221X |
| 3,402,713 | 9/1968 | Senkowski et al. | 128/221 |
| 3,469,581 | 9/1969 | Burke | 128/221 |

OTHER REFERENCES

Becton, Dickinson & Company, "Discardit," 1962, p. 4; 128—218.

Primary Examiner—Samuel Koren
Assistant Examiner—James H. Czerwonky
Attorney—Shoemaker and Mattare ABSTRACT: A hypodermic syringe is provided with a tip portion having a tapered outer surface. An adapter is fixed to the syringe and includes a tubular portion in surrounding relationship to the tapered tip, this tubular portion having internal threads formed therein. A flat end surface is formed in the adapter and extends substantially perpendicular to the longitudinal axis of the assembly. A hypodermic needle means includes a cannula and a hub, the hub having an internal bore tapered to fit on said tapered tip. Flange portions are formed on the hub and are received within and engage the internal threads of the adapter in surface-to-surface contact. The rear surface of the flange portions of the hub is convex and is formed by an annular axially extending projection spaced outwardly of the tapered tip, so as to have substantially a line contact with said flat end surface of the adapter to firmly position the needle means in place relative to the adapter and the syringe.

Patented Nov. 24, 1970

3,542,024

INVENTOR
GEORGE K. BURKE

BY Shoemaker and Mattare

ATTORNEYS

HYPODERMIC ASSEMBLY

BACKGROUND OF THE INVENTION

The present invention relates to a hypodermic assembly wherein a hypodermic needle means including a conventional Luer lock-type bore in the hub thereof is adapted to be received upon a tip formed on a hypodermic syringe, said tip having a Luer lock-type tapered outer surface.

The present invention may be employed in various hypodermic assemblies other than a hypodermic syringe wherein a detachable hypodermic needle means is employed such as in blood donor assemblies, cartridge holders, ampoules or similar constructions.

In many applications, it is desirable to provide a hypodermic assembly with a removable hypodermic needle means. Luer lock-type arrangements have been employed for this purpose in glass syringe constructions, but such arrangements have not been successfully incorporated with disposable hypodermic units formed of plastic and the like.

It is accordingly desirable to provide a construction whereby a detachable hypodermic needle means may be successfully attached to a plastic hypodermic syringe, and wherein attachment or removal may be carried out in a simple and effective manner.

SUMMARY OF THE INVENTION

In the present invention, an adapter formed of plastic is rigidly affixed to the end of a plastic hypodermic syringe. The adapter includes a tubular portion disposed in surrounding spaced relationship to a tapered tip which is integral with the syringe. This tubular portion of the adapter is provided with internal threads, the adapter further being provided with a flat end surface extending substantially perpendicular to the longitudinal axis of the hypodermic assembly.

The hypodermic needle means includes a cannula and a hub portion formed of a metallic substance. This hub portion has an internal bore which is tapered in such a manner as to fit on the tapered tip of the hypodermic syringe. The hub of the needle means also includes laterally extending flange portions which are received within the threads of the adapter in surface-to-surface contact therewith.

The threads formed in the adapter as well as the flange portions are provided with cooperating surfaces which are tapered at an angle of approximately 17° to a plane extending perpendicular to the longitudinal axis of the assembly. These complementary flat surfaces provide surface-to-surface contact so that pressure is distributed over a large area thereby eliminating damage, scoring or gouging into either the plastic or metal surfaces which might tend to cause jamming or locking of the needle means with respect to the adapter. Accordingly, the needle means may be readily attached and removed when so desired with respect to the syringe.

In addition, the rear surface of the hub of the hypodermic needle means slopes in such a manner as to provide substantially a line contact with the flat end surface of the associated adapter. This cooperation causes the aforementioned flat cooperating surfaces on the flange portions of the hub of the needle means and the internal threads of the adapter to be urged into firm contacting relationship so as to be positively urged into surface-to-surface contacting relationship thereby firmly holding the hypodermic needle means in place relative to the syringe and the adapter.

DESCRIPTION OF THE PREFERRED EMBODIMENT

Figure 1:
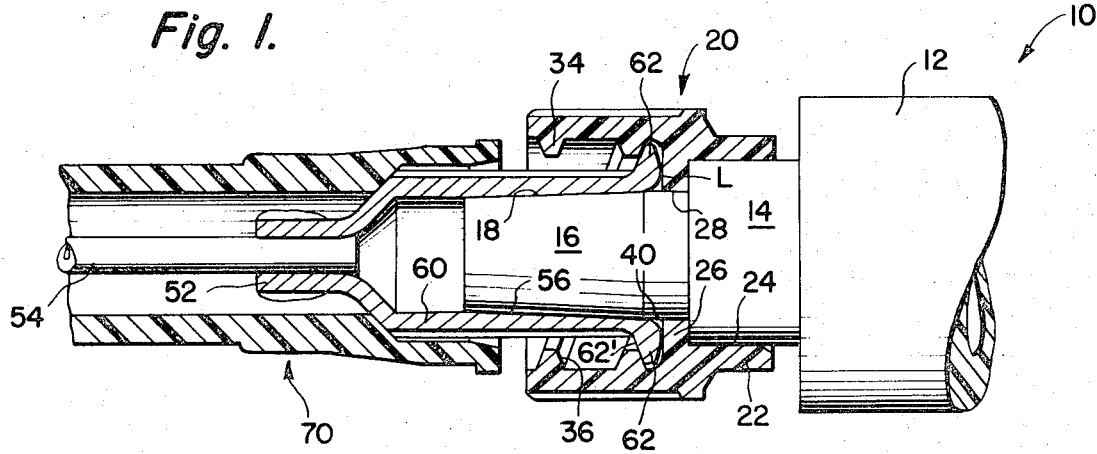
FIG. 1 is a longitudinal section through a hypodermic assembly according to the present invention.

Referring now to the drawings wherein like reference characters designate corresponding parts throughout the several views, the hypodermic assembly includes a hypodermic syringe indicated generally by reference numeral 10 which may be of relatively conventional construction and formed of a suitable plastic material such as polypropylene or the like. This syringe includes a barrel 12 having a boss 14 formed integral therewith and extending longitudinally therefrom, a tip 16 in turn extending integrally from the boss 14. It will be understood that the barrel 12, boss 14 and tip 16 have bores formed therethrough in communication with one another in the usual manner. The outer surface 18 of the tip 16 is provided with a conventional Luer lock taper as is well known in the art.

An adapter indicated generally by reference numeral 20 is formed of a suitable plastic material such as polypropylene which may be color-coded for identification purposes. The adapter includes a first tubular portion 22 at one end thereof having a cylindrical bore 24 formed therein which is adapted to fit about the boss 14 of the syringe. The adapter is suitably secured to the syringe as by employing ultrasonic welding for securing portion 22 of the adapter to the boss, or by utilizing an adhesive or the like.

The adapter includes a peripherally extending radially inwardly directed wall 26 having a central hole 28 formed therethrough. The adapter also includes a further tubular portion 30 of greater cross-sectional dimension than the first-mentioned tubular portion 22, tubular portion 30 having a plurality of longitudinally extending grooves 32 formed in the outer surface thereof.

Figure 3:
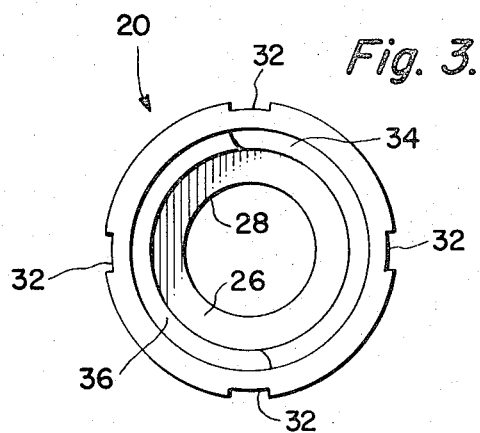
FIG. 3 is an end view of the adapter shown in FIG. 2.
Figure 4:
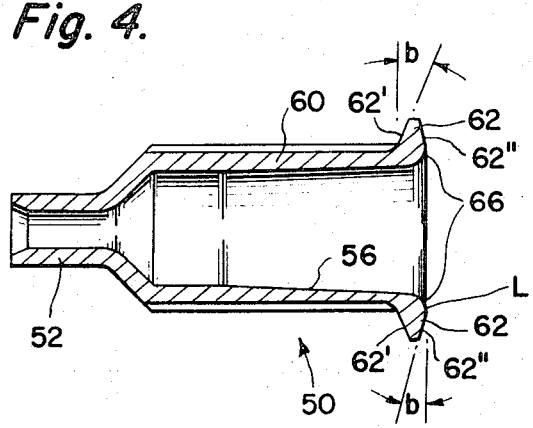
FIG. 4 is a longitudinal section through the hub of the hypodermic needle means.
Figure 5:
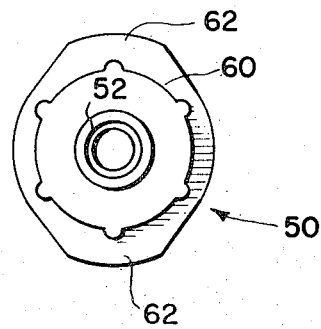
FIG. 5 is an end view of the structure shown in FIG. 4.

The adapter is also provided with a pair of internal helical threads 34 and 36, each of these threads extending through an arc of slightly greater than 180° so that the thread runout is beyond the center line as can be seen most clearly in FIG. 3. The threads are of such a dimension that they are adapted to cooperate with the flanges formed on the hub of the needle means hereinafter described so that the hub of the needle can be readily threaded into its operative position.

Figure 2:
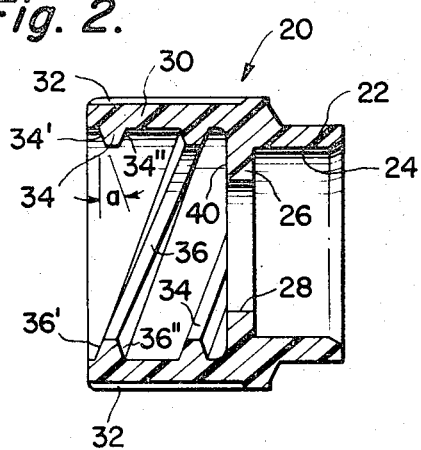
FIG. 2 is a longitudinal section through the adapter of the present invention.

The threads 34 and 36 include forward sidewalls 34' and 36' and rear sidewalls 34'' and 36'' respectively. Each of these forward and rear sidewalls of the two threads slope so as to define an angle of approximately 17° with respect to a plane extending perpendicular to the longitudinal axis of the assembly. One of these angles is indicated by reference character a in FIG. 2 of the drawings.

The adapter also includes a flat end surface 40 which extends substantially perpendicular to the longitudinal axis of the assembly and cooperates with the hub of the needle means as hereinafter described.

The hypodermic needle means includes a hub 50 which may be formed of aluminum or the like, this hub having a reduced portion 52 which is suitably rigidly secured to a conventional metallic cannula 54 in a known manner. The hub has a bore formed therethrough including a tapered portion 56 which is complementary to the outer surface of the tapered tip 16 of the syringe previously described.

The enlarged tubular portion 60 of the hub has a pair of diametrically opposite flanges 62 which extend laterally outwardly therefrom. The forward and rear surfaces 62' and 62'' of the two flanges slope at an angle indicated by reference character b of approximately 17° with respect to a plane extending perpendicular to the longitudinal axis of the assembly whereby these sloping surfaces are complementary to the sloping forward and rear sidewalls of the threads formed in the adapter so as to have a surface-to-surface contact therewith.

The rear surface of the hub includes a curved portion 66 which joins with the sloping surfaces 62'' so as to define a circumferentially extending portion L which has substantially a line contact with the flat surface 40 of the adapter when the hub is threaded into its final operative position as seen in FIG. 1 of the drawings. In this position, the forward surfaces 62' of the hub flanges 62 are in surface-to-surface contact with the rear sidewalls 34" and 36" of the threads formed in the adapter, and the line contact between the rear surface of the hub portion and the flat surface of the adapter serves to limit the movement of the hub into the adapter and cooperates with the adapter to hold the hypodermic needle means firmly in operative position.

As seen in FIG. 1, a conventional needle guard 70 formed of plastic or the like is disposed in surrounding relationship to the hypodermic needle means to protect the needle means prior to use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A hypodermic assembly comprising in combination a hypodermic syringe, said syringe including a tip portion having a tapered outer surface, a separate color coded adapter unit ultrasonically sealed to and carried by said syringe and including a tubular portion disposed in spaced surrounding relationship to said tapered tip, said tubular portion having internal thread means formed therein, said adapter including a flat end surface disposed substantially perpendicular to the longitudinal axis of said assembly, hypodermic needle means including a cannula and an interconnected hub, said hub having an internal tapered bore complementally receiving said tapered tip, said hub having flange portions extending laterally from the end thereof and being received by and engaging said internal thread means in surface-to-surface contact therewith, said flange portions including a rear surface, said rear surface being convex and formed by an annular axially extending projection spaced outwardly of said tapered tip and engaged in substantially a line contact with said flat end surface of the adapter so as to effect an axially directed thrust on said needle means to firmly position said hypodermic needle means in place relative to said adapter and said hypodermic syringe.

2. Apparatus as defined in claim 1 wherein the internal threads formed in said adapter have sloping sidewalls which slope at an angle of approximately 17° to a plane extending perpendicular to the longitudinal axis of the assembly, said flange portions on the hub having surfaces sloping at an angle of about 17° to a plane extending substantially perpendicular to the longitudinal axis of the assembly, whereby the sloping surfaces formed on said flange portions are substantially complementary to the sloping sidewalls of said internal threads.

3. Apparatus as defined in claim 1 wherein said flange portions comprise diametrically opposed flanges formed on said hub, the rear surface of said flanges including a portion of curved cross-sectional configuration.

4. Apparatus as defined in claim 1 wherein said hypodermic syringe includes a barrel, and an integral boss extending from said barrel, said adapter including a portion disposed in surrounding relationship to said boss and being fixedly secured to said boss.